(12) United States Patent
Skarzenski et al.

(10) Patent No.: US 7,003,987 B2
(45) Date of Patent: Feb. 28, 2006

(54) HYBRID SPINNER FOR MAKING A MIXTURE OF SINGLE-GLASS AND DUAL-GLASS FIBRES RIGHT AT THE FIBRE FORMING STAGE

(75) Inventors: Joseph Skarzenski, Ottawa (CA); Witold S. Czastkiewicz, Ottawa (CA); Stan Banaszkiewicz, Ottawa (CA)

(73) Assignee: Ottawa Fibre, Inc., Ottawa (CA)

( * ) Notice: Subject to any disclaimer, the term of this patent is extended or adjusted under 35 U.S.C. 154(b) by 252 days.

(21) Appl. No.: 10/164,171

(22) Filed: Jun. 5, 2002

(65) Prior Publication Data

US 2003/0203200 A1   Oct. 30, 2003

(51) Int. Cl.
*C03B 37/04*   (2006.01)

(52) U.S. Cl. ............................... 65/521; 65/522; 425/8
(58) Field of Classification Search .................. 65/521, 65/522, 502, 459, 470, 516, 523; 425/8
See application file for complete search history.

(56) References Cited

U.S. PATENT DOCUMENTS

| | | | |
|---|---|---|---|
| 2,998,620 A | 9/1961 | Stalego | |
| 3,073,005 A | 1/1963 | Tiede | |
| 3,236,616 A | 2/1966 | Stalego et al. | |
| 4,145,199 A | 3/1979 | Russell | |
| 5,431,992 A | 7/1995 | Houp et al. | |
| 5,468,275 A | 11/1995 | Lin et al. | |
| 5,474,590 A | 12/1995 | Lin | |
| 5,482,527 A * | 1/1996 | Czastkiewicz | ............... 65/502 |
| 5,509,953 A * | 4/1996 | Gavin | .......................... 65/502 |
| 5,536,550 A | 7/1996 | Houp et al. | |
| 5,591,459 A * | 1/1997 | Snyder | .......................... 425/8 |
| 5,595,766 A * | 1/1997 | Houpt et al. | .................... 425/8 |
| 5,618,327 A | 4/1997 | Aschenbeck et al. | |
| 5,624,742 A | 4/1997 | Babbitt et al. | |
| 5,629,089 A | 5/1997 | Berdan, II et al. | |
| 5,672,429 A | 9/1997 | Berdan, II et al. | |
| 5,683,810 A | 11/1997 | Babbitt et al. | |
| 5,723,216 A | 3/1998 | Houp et al. | |
| 5,786,082 A | 7/1998 | Evans et al. | |
| 5,968,645 A | 10/1999 | Caccini et al. | |
| 5,987,928 A | 11/1999 | Bernard et al. | |

FOREIGN PATENT DOCUMENTS

CA   2202208   4/1997
EP   0 994 079 A2   10/1999

* cited by examiner

*Primary Examiner*—Dionne A. Walls
*Assistant Examiner*—Lisa L. Herring
(74) *Attorney, Agent, or Firm*—Thomas J. Carvis

(57) ABSTRACT

A spinner is adapted to produce a dual glass curly fiber component and a single straight glass fiber component insulation product. The spinner includes a plurality of horizontal channels within the spinner peripheral wall. The channels separate two molten glasses of differing coefficients of thermal expansion from one another which emerge outwardly together as a dual glass curly fiber. In other portions of the spinner peripheral wall a plurality of horizontal channels carry single molten glass which emerges as straight glass fibers. The spinner provides mechanical strength and resistance to reduce deformation of said spinner as well as creating a fiber glass product with stability, compressibility and expendability.

7 Claims, 16 Drawing Sheets

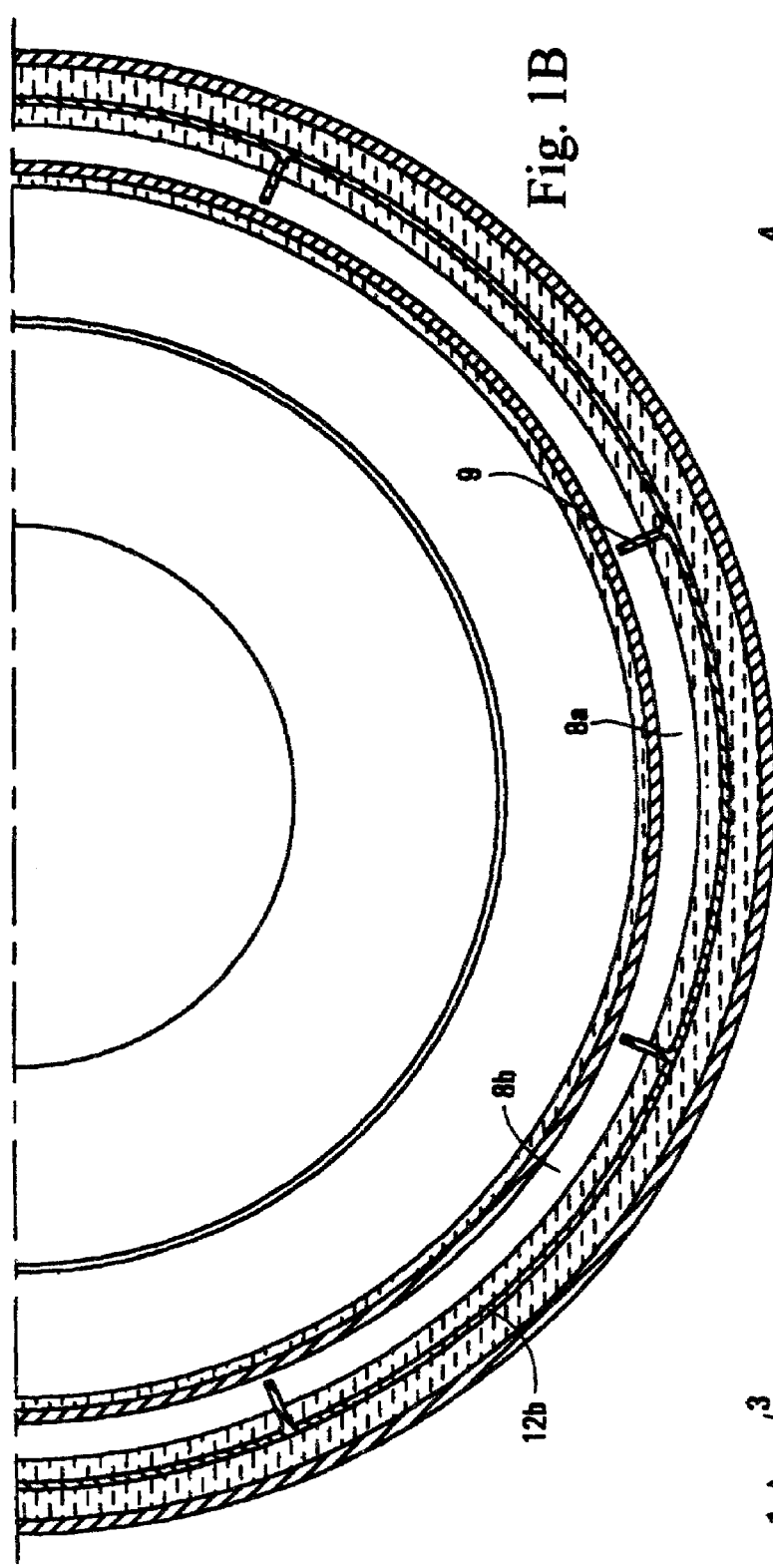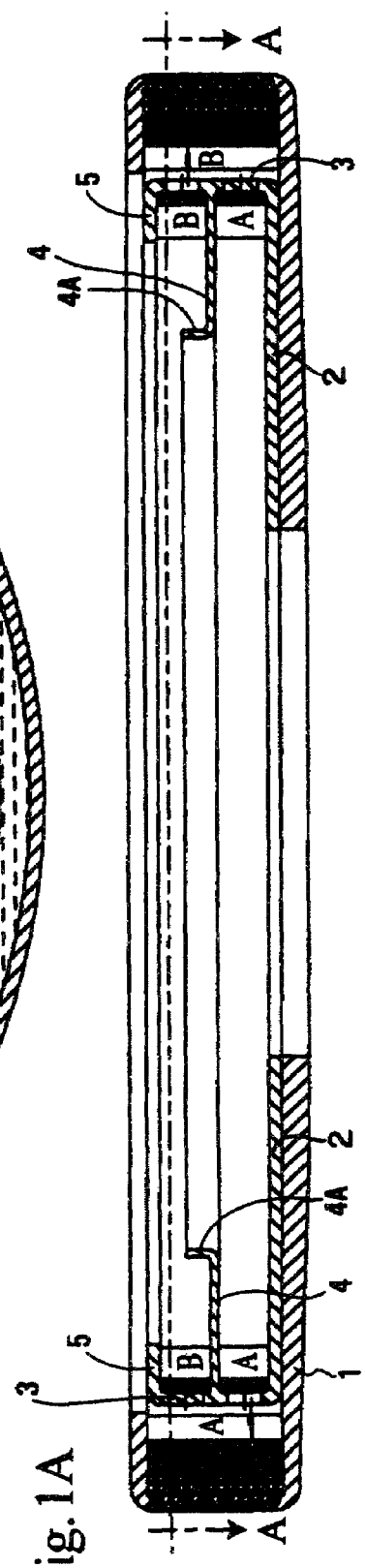

Fig. 9A
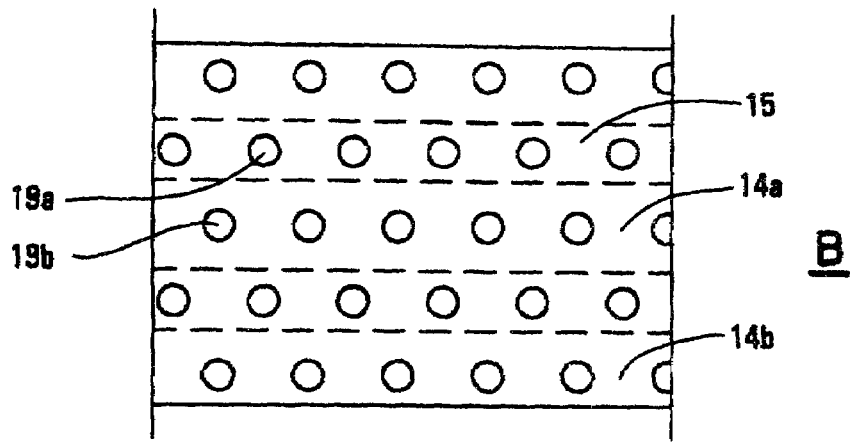
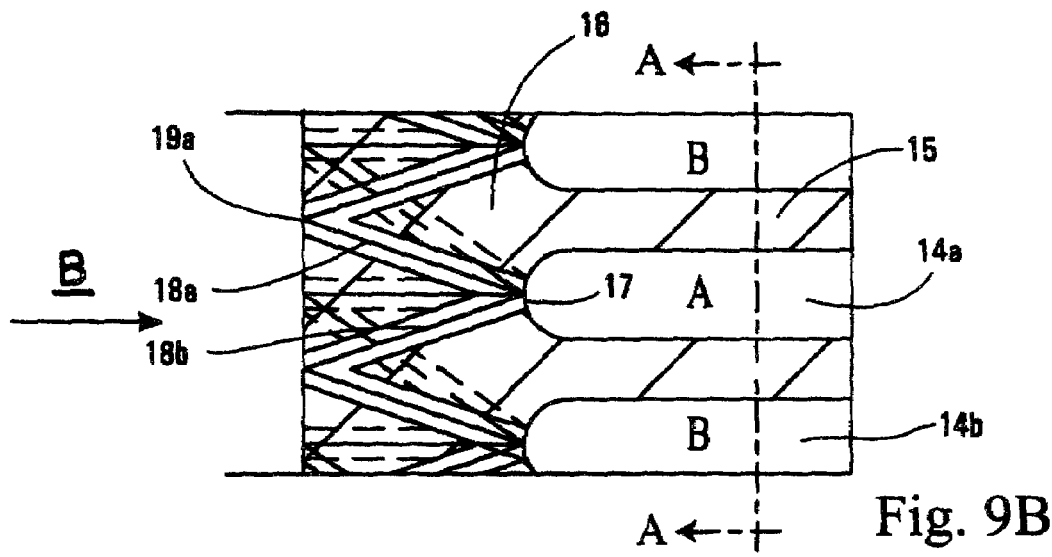
Fig. 9B
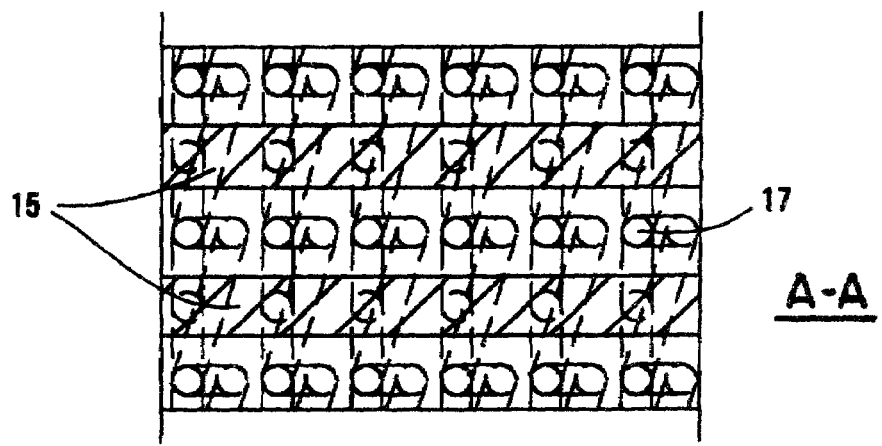
Fig. 9C

HYBRID SPINNER FOR MAKING A MIXTURE OF SINGLE-GLASS AND DUAL-GLASS FIBRES RIGHT AT THE FIBRE FORMING STAGE

BACKGROUND OF THE INVENTION

The general field of this invention is a method and apparatus for a simultaneous, rotary process, high throughput capacity manufacturing of single-component and dual-component fibres from thermoplastic materials, and thermal and acoustical insulation products formed from a certain mixture of such fibres. More particularly, this invention relates to a method and apparatus for the combined centrifuging single-component, straight and dual-component, curly glass fibres, and products formed from these straight and curly glass wool type fibres.

A typical glass fibre thermal or acoustical insulation product is made of rather short, single glass and basically straight glass fibres. A common method of manufacturing these glass wool type fibres is a rotary fiberizing process, where a single molten glass composition is forced by a high speed rotation through the orifices in the peripheral wall of a centrifuge, usually referred to as a spinner, and is further subjected to the combined action of a high temperature flame and low temperature/high velocity compressed air blasts.

It has been recognized that virtually straight fibre geometry, offered by a conventional rotary fiberizing process, certainly is not the best one for forming some high performance thermal and acoustical insulation product. It became apparent that adding an element of curvature to the basic fibre shape should, in principle, offer some highly desired and sought for features and product attributes, including a substantially higher allowable product compression ratio, therefor offering quite substantial cost savings in product storage, transportation (distribution) and also in packaging materials. Other advantages are a better volume filling ability, lower dust level, less itch, and potential for much lower organic binder level required to assure product integrity. This is due to the improved curly fibre self-cohesion, interlocking and intertwining properties. The result is lower binder cost, and reduced organic emissions. It is also reasonable to expect a slightly higher product thermal resistance, i.e., a possibility of increased earnings due to consequential density reductions.

The very first attempts to make curly glass fibre were based on a differential cooling, quenching or the like of a textile-type single glass composition fibre (U.S. Pat. No. 2,927,621). Both the fibre and process were not suitable for insulation products. Tiede in U.S. Pat. No. 3,073,005 discloses a non-rotary fiberizing process for making bi-component curly glass fibre. Two glasses with differing thermal expansion coefficients are put into side by side contact. This bi-component curly fibre was not meant to be used for insulation products. Some other patents disclosing methods of making curly or kinky glas fibres are disclosed in U.S. Pat. Nos. 3,236,616 and 4,145,199, but sill these methods would not be that practical for making an insulation product.

It is generally accepted that a non-rotary fibre-forming process cannot effectively compete with the rotary one for the economic manufacture of a typical glass fibre-insulating product. The issues are a substantially lower throughput capacity and too coarse fibre to make a good glass wool. As a consequence, some methods of imparting kink by pulling fibre from a textile bushing and mechanically crimping it by passing fibre, while still in a hot state, through a series of opposed intermeshing gears are not a viable option.

In the early 1960's, Stalego (U.S. Pat. No. 2,998,620) disclosed a rotary method for making a bi-component curly glass fibre, where two glass compositions differ in their thermal expansion coefficients, however, there is no mention of using these curly fibres for insulation products. In the mid 1990's, Owens-Corning obtained the first patents for protecting a newly developed technology for manufacturing bi-component curly glass fibre by a rotary fiberizing technique, with the clear objective of using this non-straight or irregular dual-glass fibre for thermal and acoustical insulation products. The scope of patenting is wide, including both processes, apparatus and product. By 2002, other major or global manufacturers of fibre glass insulation, namely Isover Saint Gobain and Johns-Manville, were granted patents for manufacturing dual-glass curly wool type fibres.

A typical approach to manufacture curly bi-component glass fibre by rotary fiberizing, is to use two glass formulations with widely different coefficients of thermal expansion and feed these two glasses as separate glass streams, in a radially displaced configuration, into some sort of integrated glass distributor inside a spinner assembly and force first and second glasses into alternate vertical compartments circumferentially spaced around the interior of the spinner peripheral wall. Finally, one centrifuges these two glasses through orifices drilled in the spinner peripheral wall along the adjacent compartments dividing line in such a way that the two glasses join each other in a side-to-side contact before emerging from a single orifice as a bi-component fibre.

Some spinner designs for making dual-glass curly fibres are disclosed in U.S. Pat. Nos. 5,468,275; 5,474,590; 5,595,766; and 5,987,928. Clearly, a throughput capacity offered by these dual-glass spinners cannot be reasonably high, making the whole operation rather costly.

A binderless, plastic sleeve encapsulated, extremely high compression ratio insulation product, entirely formed from rotary process which made dual-glass curly fibre, became commercially available in the early 1990's. Since the product had no binder, an irregularly-shaped glass fibre, after being collected at approximately 600 degrees Celsius temperature on opposed, downwardly converging collection conveyors, were passed through a heat-setting oven to shape the individual fibres into a cohesive insulation product at temperatures from approximately 400 to 600 degrees Celsius.

There are numerous patents disclosing both the method of manufacturing (process) and dual-glass fibre insulation products, for example, the following U.S. Pat. Nos.: 5,431,992; 5,536,550; 5,618,327; 5,629,089; 5,672,429; and 5,723,216. Insulation products comprised of irregularly-shaped glass fibres exhibit a substantially uniform volume filling nature, and provide improved thickness recovery and thermal insulating abilities.

Irregularly-shaped dual-glass fibres for pourable or blowable loose-fill insulation products (blowing wool) are disclosed in U.S. Pat. Nos. 5,624,742; 5,683,810; and 5,786,082. Some benefits include improved coverage (lower product densities), higher thermal efficiency and less dust upon blowing or pouring. A loose-fill insulation product can entirely be made of irregularly-shaped dual-glass fibres, or be some blend of single-glass and dual-glass fibres.

A need exists for an improved glass wool insulating material. Of particular importance is a substantially higher product thickness recovery (allowable compression ratio) and reduced thermal conductivity. The product should be made in a cost effective way, meaning production rates closely matching the existing ones, and the overall process changes kept to the absolute minimum. It is believed that insulation material made as some mixture or blend of single-glass straight, and dual-glass curly fibres, simultaneously fiberized by the same spinner, mixed right during the fibre-forming stage, bonded by a 20 percent to 50 percent reduced amount of standard, phenol-formaldehyde binder, and further processed in a standard or conventional way, should in principle meet expectations. No use of an encapsulating plastic sleeve should be necessary. The insulation product should be suitable for all typical applications. Skin irritation and material dustiness, factors particularly important to product end users or installers, should be reduced.

U.S. Pat. No. 5,968,645 discloses an insulation product made as a mixture of single-component and multi-component inorganic fibres, where the material cohesion and shape is ensured, at least partially, by using some sort of organic or inorganic binder. Such product exhibits a remarkable recovery of thickness after decompression. Being compressed to 1/20th of its initial thickness for 72 hours, the product bounces back to 110 percent to 120 percent of its nominal thickness, the thickness required during product installation after unpacking. This 20:1 compression ratio favourably compares with a typical 10:1, allowable ratio for a standard, single-component light density fibreglass insulation products. For a given product density, its thermal insulation performance is slightly better as well. Unlike a binderless, plastic sleeve enclosed or encapsulated insulating material, consisting only of bi-component irregularly-shaped glass fibres, this product lends itself to thermal or acoustical insulation of vertical walls in buildings.

Canadian Patent Application CA 2202208 describes a method and device for producing mineral wool products being in principle a mixture of four distinct types of glass fibres, namely a straight single-glass fibres of glasses A and B, curly dual-glass fibre where there is a mutual side-to-side contact along the entire fibre length, and a composite or compound curly fibre where two single-glass fibres are joined at separate points only along the compound fibre length, resulting in a twisted or curled rope ladder fibre structure. The spinner design is based on having separate and alternate vertical glass compartments and two chambers for glasses A and B along the spinner circumferential wall. By adding single-glass orifices to a dual-glass spinner structure, a substantial increase in productivity can be achieved. This modified spinner follows the basic design explained in U.S. Pat. No. 5,987,928.

Thermal and mechanical properties of such insulation product can be controlled and optimized. There is a wide field of possible combinations and/or mixtures of pure mono-composition straight fibres, composite curly fibres and bi-component irregularly-shaped fibres to choose from. Softer glass will work as a binder, at least in certain cases. There is no direct mention of using standard organic binder for this mixed fibre insulation product made by a rotary fiberizing technique.

European Patent Application EPO 994079 discloses a method and apparatus for manufacturing an insulation product consisting of single-glass straight and dual-glass curly fibres. It discloses a dual-glass spinner with separate vertical glass compartments for glasses A and B, arranged in an alternate fashion along the inner side of the spinner circumferential wall, is additionally equipped with a multiplicity of single-glass bores drilled in the spinner peripheral wall in the central area of any vertical glass compartment. A substantial spinner throughput capacity increase will result. The thermal and/or acoustical insulation product is a mixture of straight single-glass fibres of glass A, glass B and dual-glass curly fibres. It is claimed to be a binderless product. Thermal, and particularly mechanical properties of the insulation product are expected to be substantially improved.

SUMMARY OF INVENTION

The object of the present invention is to provide an integrated or hybrid dual-glass/single-glass spinner and a method to produce a mixed straight/curly fibre insulation product with improved thermal and mechanical properties, particularly with respect to the allowable compression ratio or thickness recovery.

The essence of the invention is a multiple, horizontal and alternate layering of glasses A and B along the height of inner surface of the spinner peripheral wall, combined with extruding these glasses through a unique geometry of bores drilled in the spinner peripheral wall in such a way as to result in a high density exit hole pattern with the required distribution of single-glass and dual-glass orifices on the peripheral wall surface.

There are two basic approaches to implement this process concept. One could use a specialized spinner casting, where the separate, vertically displaced fiberizing zones for making either a dual-glass or single-glass fibre are already built in into the spinner geometry or structure. Many particular configurations are possible. Some examples will be given below. The second approach is to use the present invention dual-glass spinner casting, and only vary the orifice configurations drilled in the spinner peripheral wall. Again, a variety of possibilities or options exist.

In order to produce the straight/curly glass fibre insulation product using the spinner of the present invention, modifications are nominal. For example, the baffles on the lower periphery of the spinner can be eliminated and glass A can pass directly outwardly through a series of radially extending channels from orifices on the inside of the peripheral wall of the spinner. With regard to the dual glass fibre output these continue to be passed through the upper part of the peripheral wall through channels for glass A and glass B whereupon inner orifices in the peripheral wall extend into numerous channels connected to orifices on the outer peripheral wall where the two glasses meet to form a curly fibre.

In a second configuration, dual glass fibre are created in the upper peripheral wall of the spinner and straight glass fibres are created there below. Another plurality of dual glass fibres are created with straight glass fibres below that, and finally, dual-glass fibres are created at the bottom of the spinner.

In a third configuration, dual-glass fibres A and B are created in the upper portion of the spinner. Straight glass fibres A are created there below, followed there below by dual-glass fibres followed there below by glass B straight fibres and finally at the bottom of the spinner dual glass fibres A and B are again formed. It is to be understood that such configurations can be varied with little changes other than the positioning of the horizontal baffles and the position of the peripheral wall.

The inventors have produced an apparatus for making bi component glass fibers including single straight glass fibers and dual glass component curly fibers, comprising:

a spinner having a bottom wall, a circumferential peripheral side wall, and an upper horizontally disposed top flange;

said apparatus including equipment for supplying first and second molten materials to a distributor spinner cup located within said spinner;

said spinner further comprising a plurality of vertically oriented flanges circumferentially placed about an inner surface of said spinner peripheral side wall;

said vertically oriented flanges extending radially inwards and terminating adjacent to an outer side of a vertically disposed peripheral wall of said distributor spinner cup, thereby providing a plurality of vertically oriented compartments;

said distributor spinner cup also including a bottom wall fixedly attached to said bottom wall of said spinner, and a horizontally disposed mid-flange extending inwardly from said vertically disposed peripheral side wall; said mid-flange including an upturned vertically disposed circumferential end flange, and said distributor cup having a horizontally disposed top flange extending radially inwardly from the top of said vertically disposed peripheral side wall;

said distributor spinner cup mid-flange being adapted receive a second molten B glass stream and, in operation, through rotation, centrifugally move said glass B stream to an inner side of said peripheral wall of said cup, above said mid flange through a plurality of horizontally disposed apertures openly connected to every second adjacent vertically oriented compartment;

said spinner distributor cup bottom wall being adapted to receive a first molten glass stream A and, in operation, through rotation, centrifugally move said first molten glass stream A to said inner side of said peripheral side wall of said distributor spinner cup below said mid-flange, through a plurality of horizontally disposed apertures openly connected to every first adjacent vertically oriented compartment;

said spinner peripheral side wall having an inner wall, an inner interior wall portion, an outer interior wall portion, located outwardly of said interior wall portion, and an outer wall;

portions of said inner wall and said inner interior wall of said spinner peripheral side wall having a plurality of first horizontal open slots, adapted to receive glass A from glass A vertical compartments, and vertically disposed upwards or downwards adjacently a plurality of second horizontal slots adapted to receive glass B from glass B vertical compartments, thus said horizontal slots are stacked upwardly and downwardly with adjacent molten glass streams of A and B glass;

each glass stream A exiting outwardly from said first horizontal slots to an annular, non-interrupted, horizontally-disposed cavity located circumferentially within said inner interior wall portion of the spinner peripheral side wall;

and each glass stream B exiting outwardly from said second horizontal slots to an annular, non-interrupted, horizontally-disposed cavity located circumferentially within said inner interior portion of the spinner peripheral side wall;

each of said cavities containing said A and b glasses, derived from said first and second horizontal slots, including a plurality of exit orifices, each of which communicates with plurality of passages extending outwardly within said outer interior wall of said spinner peripheral wall side wall which join together as A & B combined glass streams and exit through common orifices in said outer peripheral wall of said spinner peripheral side wall to form in operation, dual-component helical, curly glass fibers of two glasses of differing coefficients of thermal expansion;

and said spinner peripheral side wall also comprising in at least one predetermined height portion a plurality of third adjacent vertically disposed horizontal open slots, all of which being adapted to accept only one of each of glass A or glass B;

said slots extending radially outwards throughout the said peripheral side wall to a single orifice in said outer wall, in operation forming straight class fibers;

wherein in operation said spinner creating a mixture of said dual-component helical curly glass fibers and said straight glass fibers to form a hybrid fiberglass insulation product.

BRIEF DESCRIPTION OF THE DRAWINGS

The invention will be more clearly described in conjunction with the accompanying drawings wherein:

FIG. 1A is a transverse cross section of a spinner used in the present invention;

FIG. 1B is a top view of the spinner showing one half of the total circumference;

FIGS. 9A, 9B and 9C are similar types of drawings as FIG. 8 showing the channels and hole drilling patterns;

DETAILED DESCRIPTION OF THE INVENTION

Figure 2:
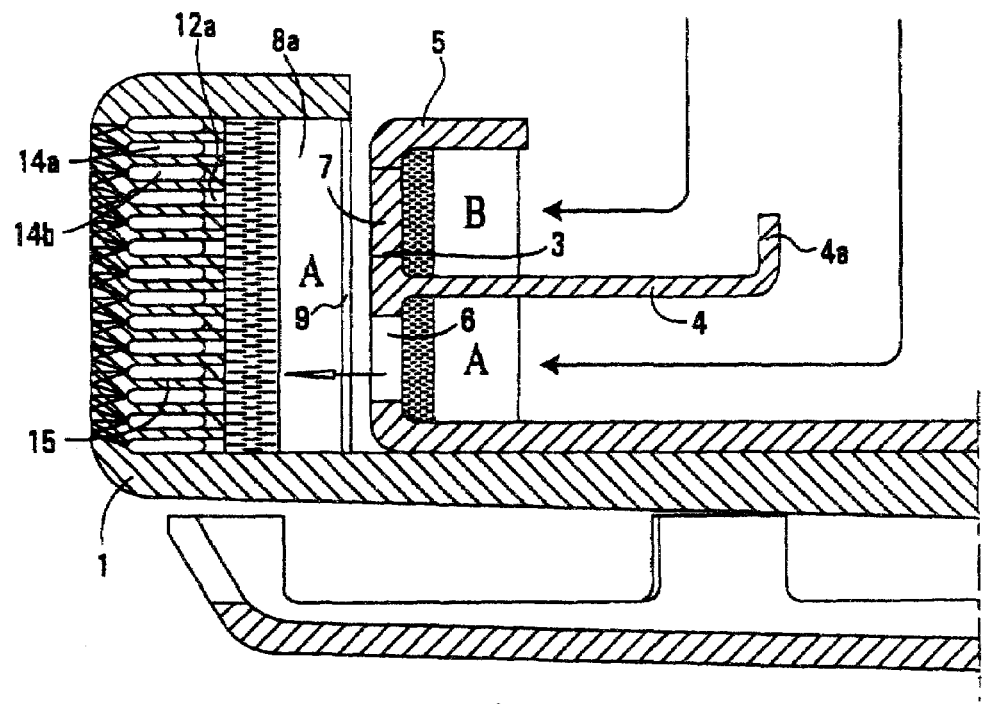
FIG. 2 is an expanded view of a transverse cross section of one side of the spinner.

FIG. 1A is a transverse cross section of a spinner used to produce glass fibers through centrifugal force, heat, and aerodynamic pressure. The spinner 1 is basically a round dish having a peripheral circumference with holes drilled therein. The spinner has an upper top side flange but otherwise has an open top which permits molten glass to enter into the spinner and be forced to the circumference. In FIG. 1A there is mounted within the spinner a distributor spinner cup 2. The cup is fixedly mounted within the spinner. It has a peripheral wall or rim 3, a cup middle flange 4, and a middle flange upturned member 4A. The cup also has a top flange 5. The purpose of the cup is to separate two molten glasses A and B. Molten glass B is directed into the cup on top of the middle flange 4 whereas molten glass A falls inwardly of the cup middle flange upturned member 4A.

On examination of FIG. 2, one views that a molten stream of glass B descends upon the distributor spinner cup middle flange 4 while glass A falls to the bottom of cup 2 and exits through glass A slots 6. Glass B, on the other hand, exits through glass B slots 7.

As can be seen in FIG. 1B, which is a cross section A—A of FIG. 1A, the periphery of the spinner on the exterior side of the cup 2 is divided into a number of chambers separated from one another by vertical baffles 9. In a preferred embodiment, eight circumferential compartments are used; four for glass A and four for glass B. Hence, around the circumference of the cup, glass B, directed through holes 7, is directed to vertical chambers 8b and glass A is directed to alternate vertical chambers 8a. From chambers 8a and 8b.

the molten glass is permitted to pass towards the periphery of spinner 1 by means of slots 12a for glass A, and 12b for glass B. Only those chambers marked as 8a permit the passage of glass A glass towards the periphery and only those chambers marked as b, i.e. the alternate circumferential chambers, permit glass B to pass towards the periphery. Before proceeding further, it is noteworthy in FIG. 4 that the spinner bottom is marked as 11 and the spinner top as 10. Slots 12a and 12b, which are shown in FIG. 5 and which are directed radially outwardly, are separated by ring-shaped internal horizontal flanges. Thus glass A has access only to those slots 12a and glass B has access only to those slots 12b. Within the peripheral wall, however, glass A slots pass towards circumferential cavities 14a and glass B passes through to circumferential cavities 14b.

Figure 3:
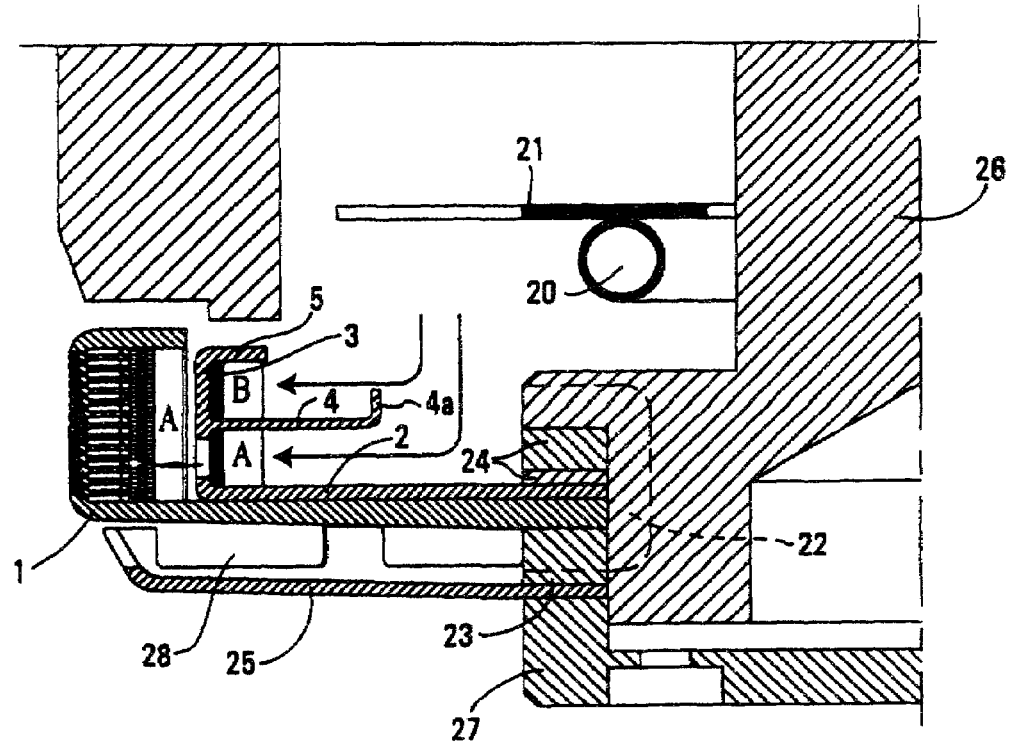
FIG. 3 is a transverse cross section of approximately one half of the spinner with other components.

Before proceeding with the essence of the invention, i.e. the peripheral hole formation, one must understand in FIG. 3 the basic components of the spinner mechanism. The spinner 1 turns at approximately 2400 r.p.m. In order to keep the molten glass at a sufficiently high temperature, there is an inner burner 20 and an inner burner deflector ring 21. Spinner 1 is attached to a mounting hub 26 having a mounting cap 27. Mounting hub 26 has a number of peripheral grooves or slots 22 and the spinner 1 has a bottom radiation shield 25 to contain the heat upwards.

Separating the slotted bottom radiation shield 25 from the spinner 1 is a slotted spacer ring 23. Spinner 1 is also equipped with a number of spinner elevation adjustment spacers for adjusting the spinner in relation to the mounting hub 26. Between the slotted bottom radiation shield 25 and the spinner bottom 11 are a number of bottom radiation shield exit slots 28. Mounting cap 27 mounts the spinner 1 to the mounting hub 26 by means of bolts.

Figure 4:
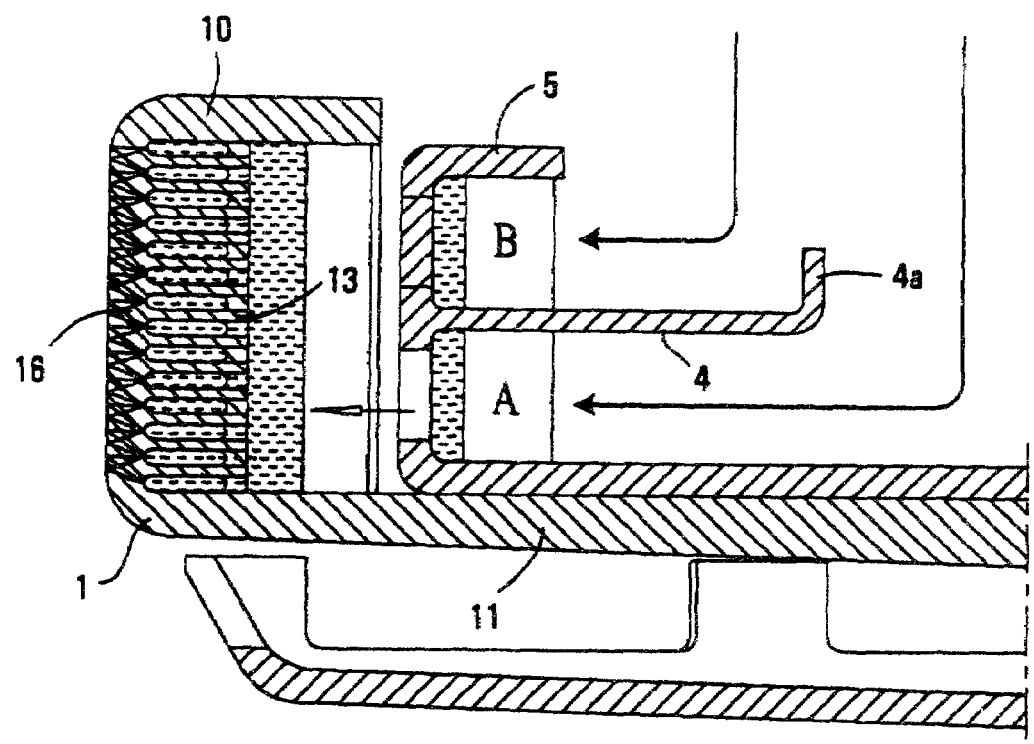
FIG. 4 is similar to FIG. 2 with different components shown.
Figure 5:
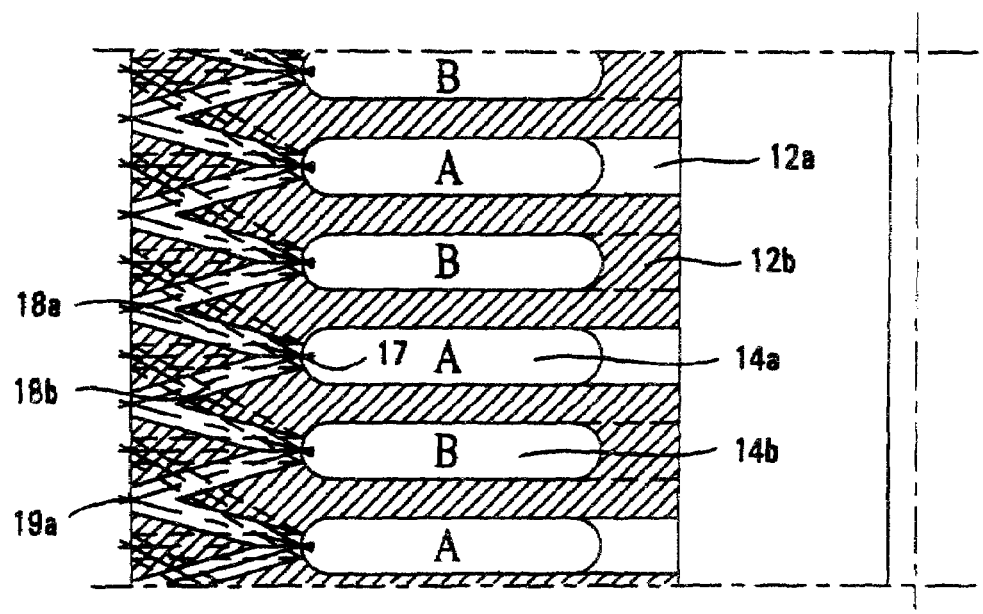
FIGS. 5 and 6 are expanded views of the transverse cross section of the spinner's interior and exterior peripheral walls.

In FIG. 4, the spinner 1 has an inner peripheral wall 13 and an outer peripheral wall 16. As previously mentioned, glasses A and B enter the peripheral wall through slots 12a and 12b, which are separated by horizontal flanges 15. Within the circumferential wall as glass A circumferential cavities 14a and glass B circumferential cavities 14b. Thus, as shown more clearly in FIG. 5, glass B and glass A are alternately permitted to enter through the spinner peripheral side wall bounded by inner peripheral side wall surface 13 and outer peripheral side wall surface 16.

Figure 6:
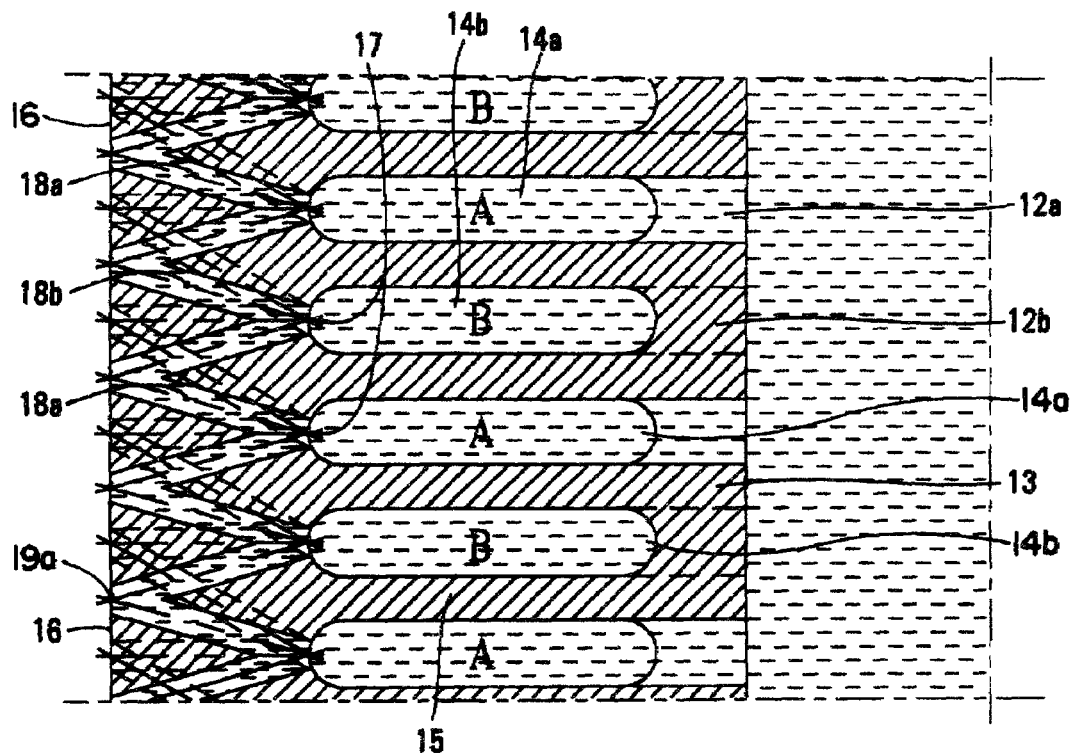
Figure 7:
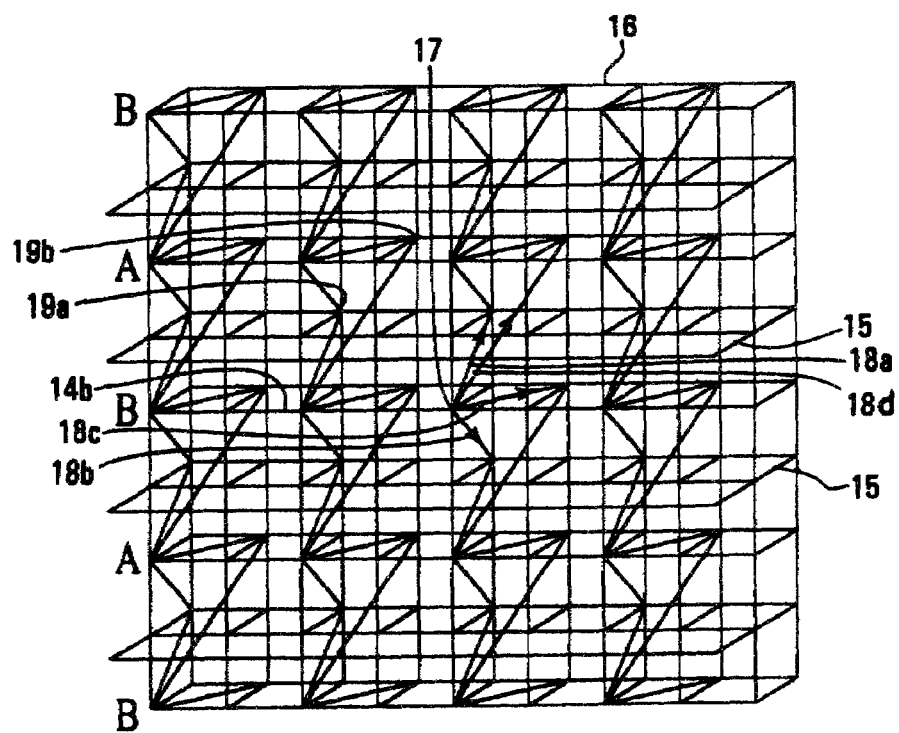
FIG. 7 is a perspective view from the inside of the spinner peripheral wall showing a hole drilling pattern.
Figure 8A:
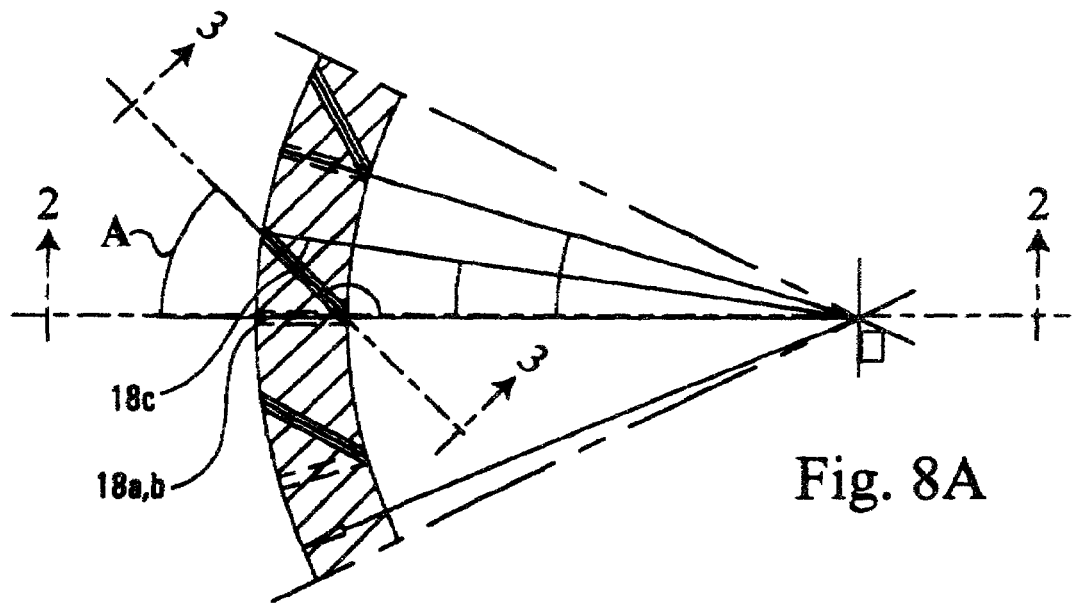
FIGS. 8A, 8B and 8C show various sections the channels through which the glass passes at various angles.
Figure 8B:
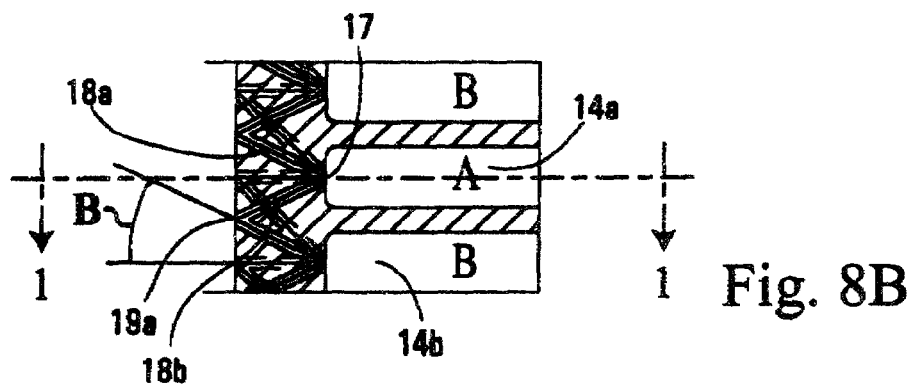
Figure 8C:
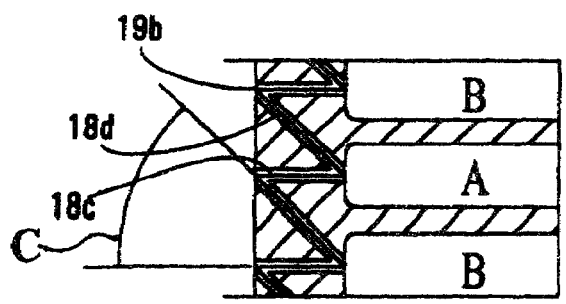

FIG. 6 shows more closely the inner peripheral wall surface 13 and the outer peripheral wall surface 16 of the spinner peripheral side wall. Slots 12a and 12b enter through the inner peripheral wall surface 13 and then become annular circumferential non-interrupted horizontal cavities for glass A and glass B shown as 14a and 14b, respectively. Separating these annular circumferential non-interrupted horizontally disposed cavities are horizontal flanges 15.

As glass A progresses outwardly through annular circumferential non-interrupted cavity 14a, it enters an inlet hole 17 on the inside of the outer peripheral spinner wall 16. Similarly, as glass B progressed outwardly through cavities 14b, it also enters an inlet hole 17. From common inlet holes 17, in a preferred embodiment, a plurality of channels emerge, some lead outwards radially and some are angularly slanted and lead outwards.

In a preferred embodiment there are four such channels generally labeled, as is shown in FIGS. 6, 7, 8 and 9 as 18a, 18b, 18c and 18d. The outer side of peripheral side wall 16 is equipped with a plurality of highly structured patterned holes 19a for outlet hole type A and 19b for outlet bole type B. Through this innovative configuration of slanted and radially outward channels, both glasses A and glasses B join in each one of holes 19a and 19b. Thus, the two glasses emerge from outer peripheral wall 16 through orifices 19a and 19b, together side by side. Because of their different coefficients of thermal expansion, the two glasses shrink upon cooling to a different degree thus forming curly or irregularly-shaped fibers which are then directed downwardly and collected on a continuous belt conveyor, equipped with bottom suction.

Drawings 8A, 8B and 8C and 9A, 9B and 9C show various configurations through different views, wherein glass A and glass B are lead through inlet holes 17 and move in the unique configuration of slanted and radially drilled channels into outlet holes 19a and 19b.

The essence of this invention is to create an insulation product of dual-glass fibre of twisted or curly nature along with straight glass fibers wit high-capacity throughput, through the use of a unique geometry or configuration for drilling fiberizing orifices in the spinner peripheral side wall.

Figure 10:
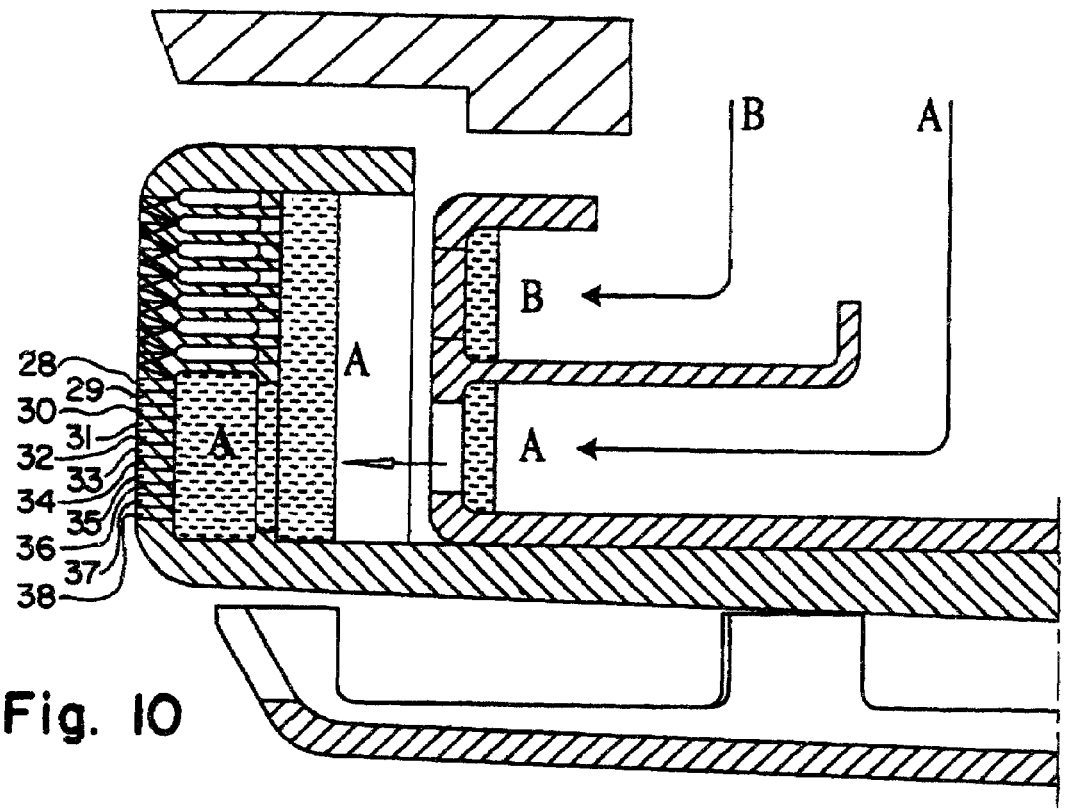
FIGS. 10 to 12 show different configurations of the peripheral wall of the spinner.

FIG. 10 is a modified version of the dual-glass spinner which will produce both straight and curly glass fibers. As noticed, glass B still descends upon the upper portion of the spinner distributor cup and glass A is directed towards the lower portion of the cup. These through-spaced orifices move trough centrifugal force glass B into glass B vertical baffle chambers and glass A into glass A vertical baffle chambers. Glass B, however, is not permitted to enter the lower portion of the peripheral wall, but simply the upper potion along with glass A thereby creating a dual glass fibre. Glass A, on the other hand, can continue directly outward in the lower portion of the spinner though a plurality of orifices radially and thus, as shown in FIG. 10, move outwardly through orifices 28 through 38, thereby producing a straight fibre outwardly of the outer peripheral side wall of the spinner.

Figure 11:
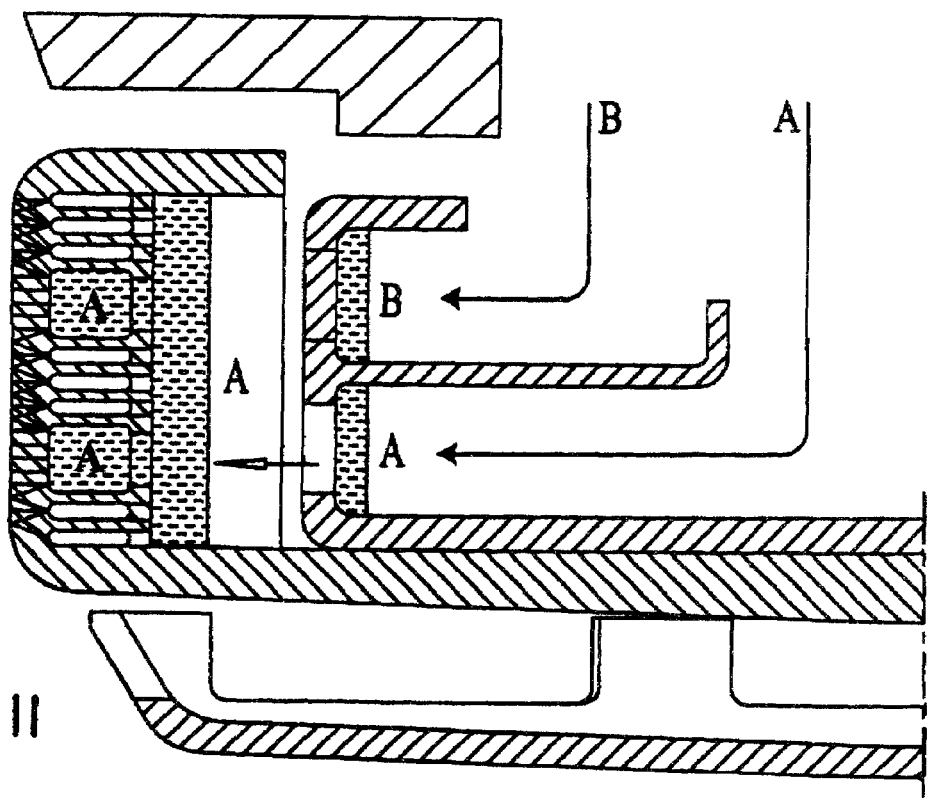

In FIG. 11, glass A is permitted to emerge from its vertical chambers, generally four in number, outwardly either, through channels A, which direct it through both slanted and radially aligned channels to outer orifices, or directly through the portions marked A through straight radial channels thereby producing glass A straight fibres. These portions have been marked by having them cross-hatched in the spinner area.

Glass B is permitted only to emerge through orifices on the inner walls between the horizontal baffles outwardly to the inner peripheral wall and then is directed to a number of slanted or radial channels to come together in a common outer peripheral wall orifice having both glasses A and B joined and through the difference in their coefficients of thermal expansion, produce a curly fibre.

Figure 12:
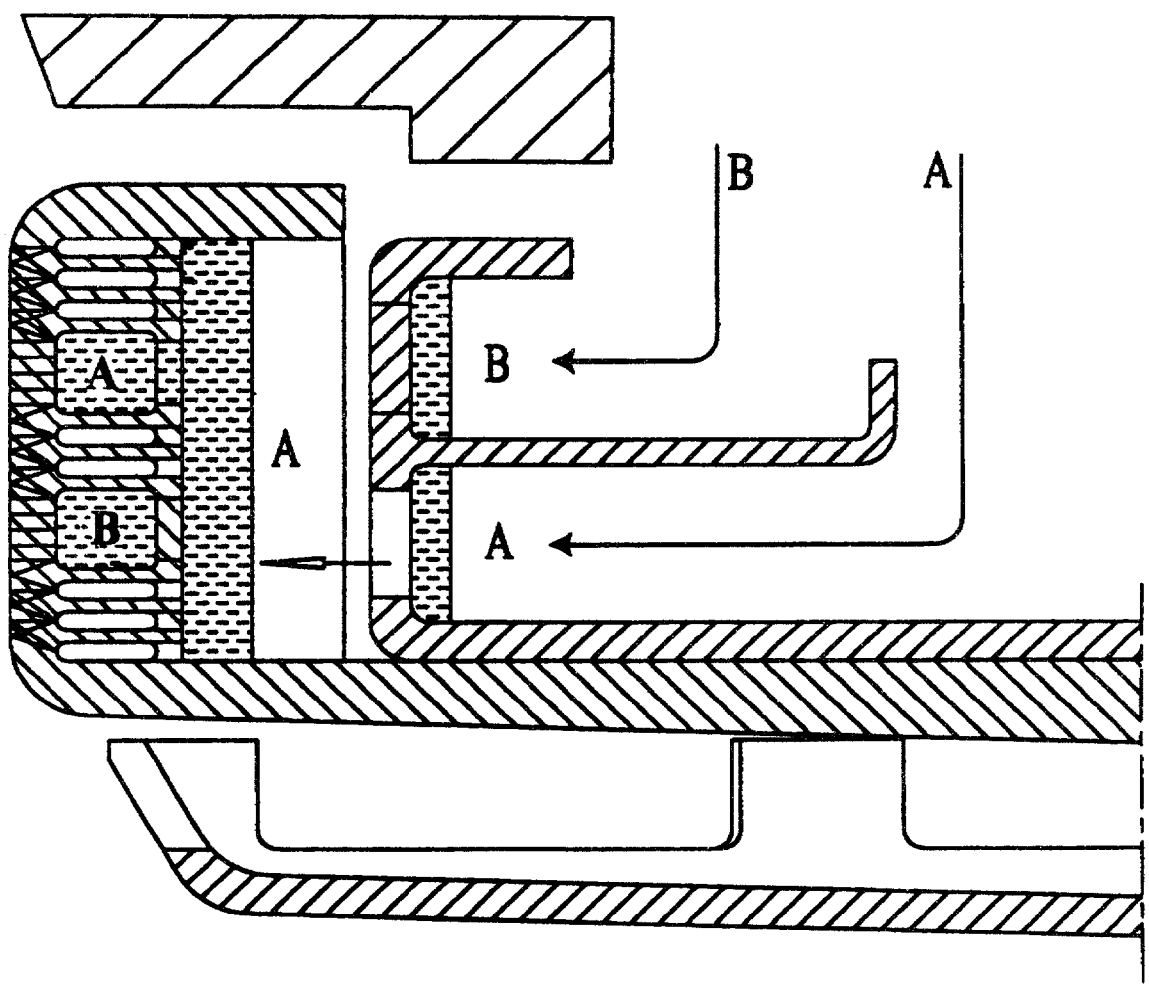

In a third embodiment of the present invention shown in FIG. 12, glasses A and B are permitted, through orifices and channels, to both produce two different straight fibres of glasses A and B and curly fibres at three different positions on the spinner outer peripheral wall.

As an aside, one may also use different (actually somewhat simplified) spinner casting and mix fibre in horizontal layers or zones.

A simplified casting is lighter, probably easier to heat up and less expensive, using lesser amount of highly priced cobalt-based or nickel-based super alloy.

It is possible to make a mixture of single-glass and dual-glass fibres by using a dual-glass spinner in its modified (simplified form already described, or by utilizing a full dual-glass spinner casting, only with the adjusted hole drilling pattern to suit one's needs. A full dual-glass spinner casting gives a freedom of choice as to the single-glass to the dual-glass mass ratio after the spinner is cast with different drilling.

Figure 13:
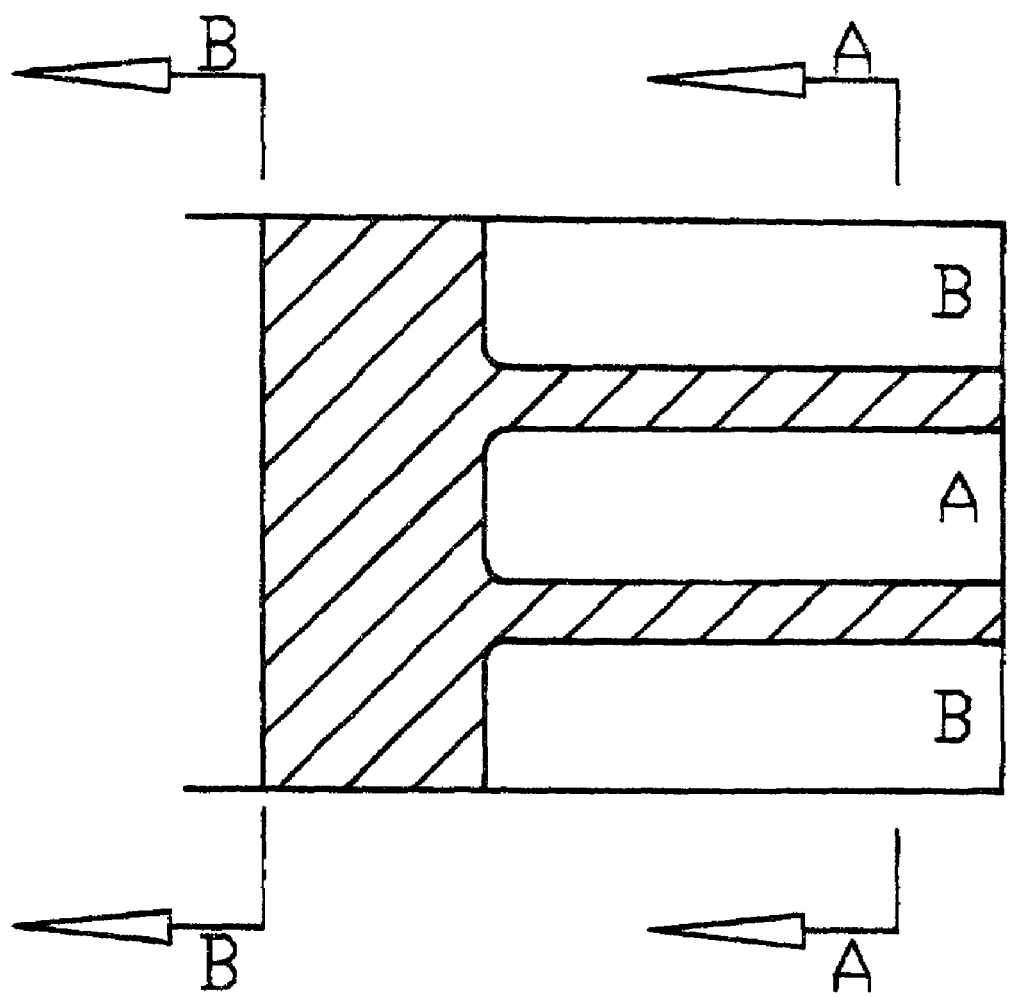
FIGS. 13 to 20 show different hole drilling patterns.

Drawings beginning with FIG. 13, as a general introduction, show the top sketch always gives an entry hole pattern, section A—A in FIG. 13. The bottom sketch shows the appearance of the resulting exit holes, section B—B of FIG. 13. The type of glass for the entry, and fibre composition at the exit is clearly marked (A, B, A+B).

FIGS. 14 to 20 show some of the possible hole drilling operations.

Figure 14:
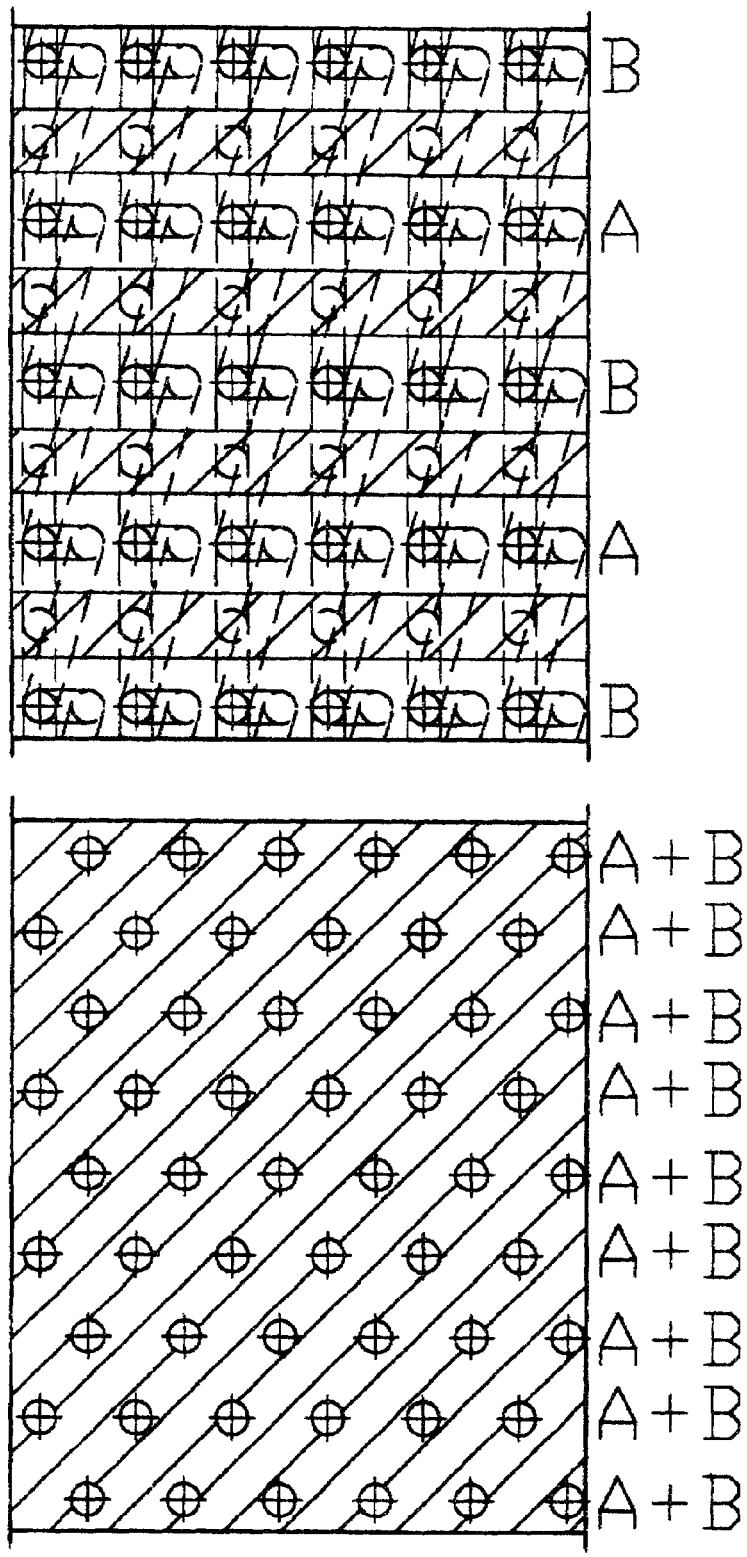

FIG. 14 shows A+B fibre only, that is to say, four channels per single entry hole which is a typical dual-glass fibre hole drilling pattern.

Figure 15:
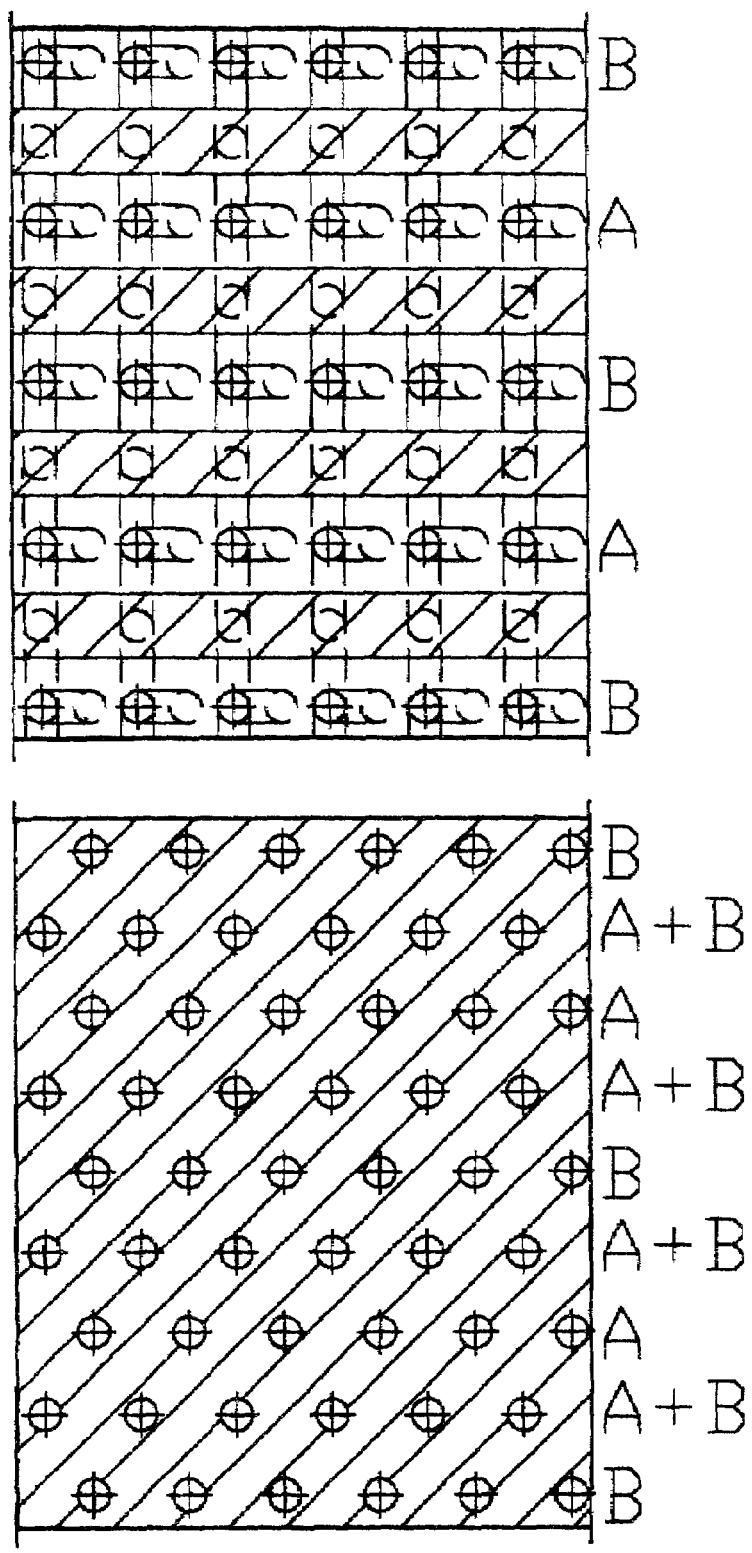

FIG. 15 shows (A+B), A and B fibre; (A+B):(A,B)=1:1 mass Ratio of Dual-component (A+B) glass fibre, to single-component glass fibre made both of glasses A and B. Different fibre types are formed in horizontal layers (1-Dimensional mixing). There are three channels per entry hole. Horizontal and vertical channels of different diameters deliver the same amount of molten glass per unit of time, re a 1:1 mass ratio dual-glass to single-glass (combined glass A and glass B fibres) in the insulation product. By varying mass flow rate per channel, also other dual-glass to single-glass mass ratios can be achieved in a fibre mixture.

Figure 16:
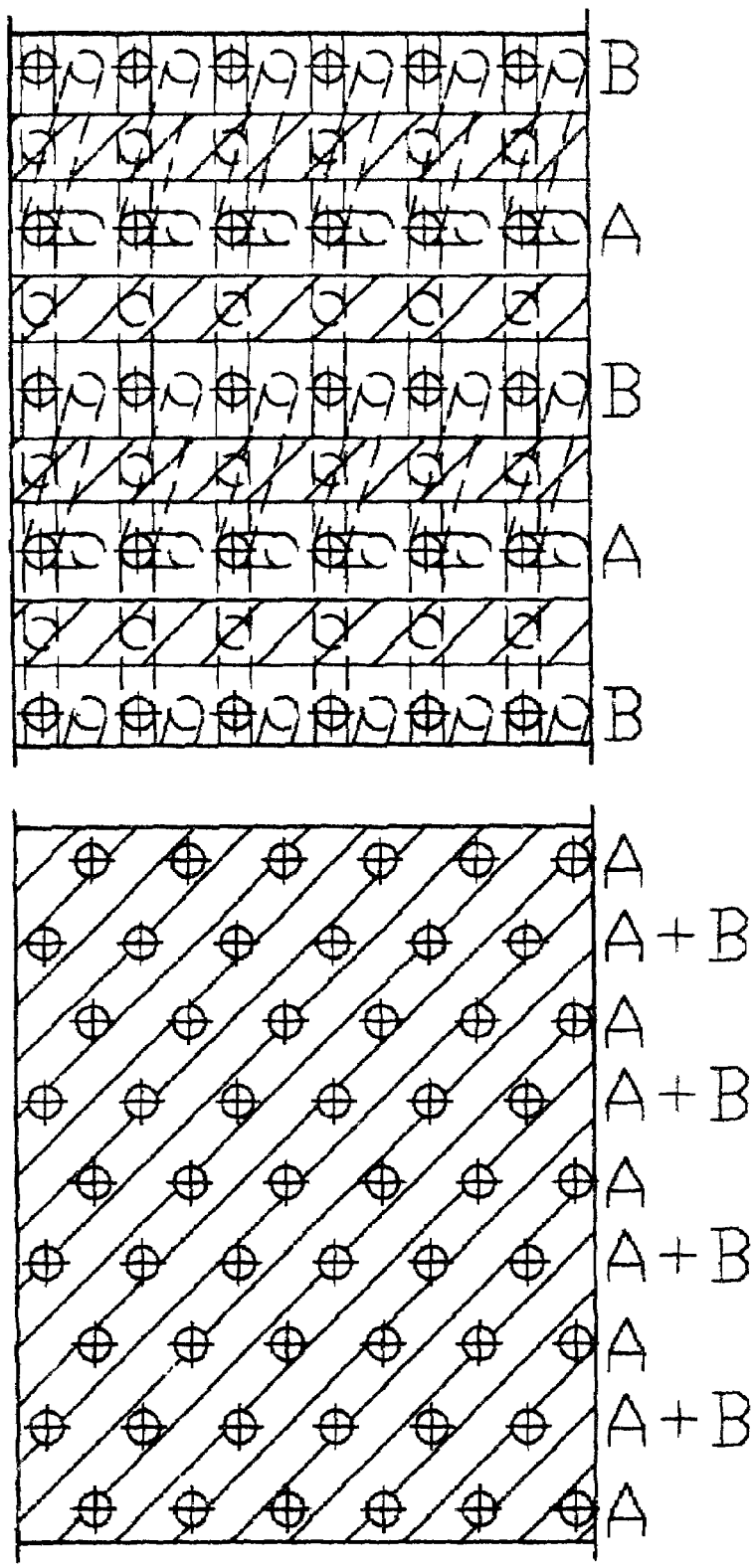

FIG. 16 shows (A+B) and A Fibre; (A+B):A=1:1 Ratio Only glass A will be used to form single-component glass fibre. There will be no single-component glass B fibre in the product. Four channels for entry holes supply glass A, and two channels for entry holes supplying glass B. Channel diameter is adjusted to have the same mass flow rate, and therefore a 1:1 dual-glass (A+B) to single-glass A mass ratio in the insulation product.

A practical way of achieving a high difference in thermal expansion coefficients of glasses A and B, needed for making curly fibre this way, and still maintaining other glass properties at the desired level is to use two alternate glass compositions, namely high soda-low boron versus high boron-low soda glass composition. Boron is the most expensive component of a glass batch. Soda is the second most expensive component, its price being more or less half of boron. Other batch components are relatively inexpensive, for example, nepheline syenite costs about $33.00 Cdn per ton. Basically, it is boron and soca interaction which make a batch price difference.

Figure 17:
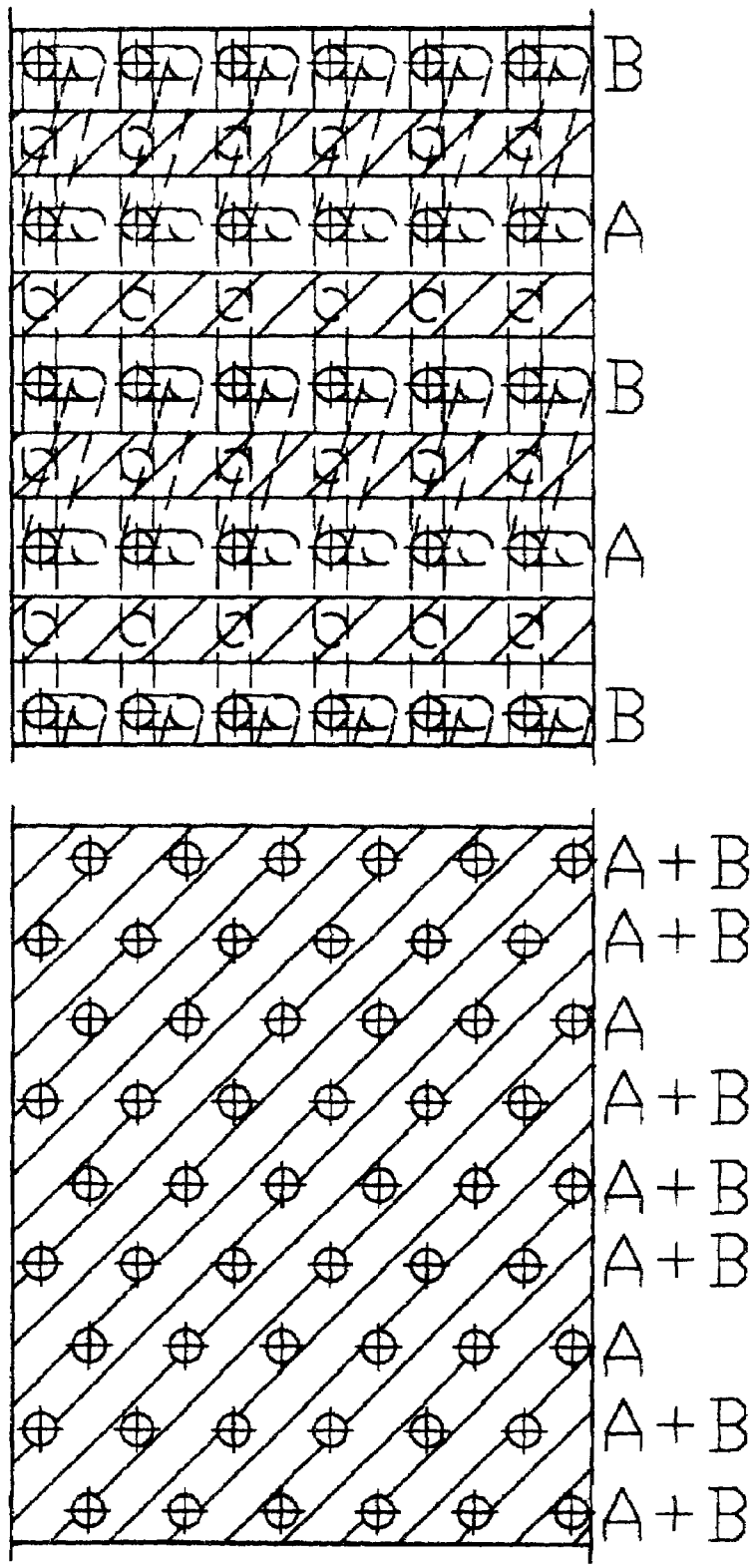

FIG. 17 shows a hole pattern for (A+B) fibre and A fibre, i.e. (A+B):A=3:1 Ratio. There is a large percentage (75% by mass) of bi-component glass fibre in (A+B) and A fibre mixture. Four channels per hole receive glass A, one channel per hole receives glass B. All channels, in principle, are not the same diameter. Glass A fibre is sandwiched between horizontal layers of (A+B) fibres, that is to say, 1-D mixing.

Figure 18:
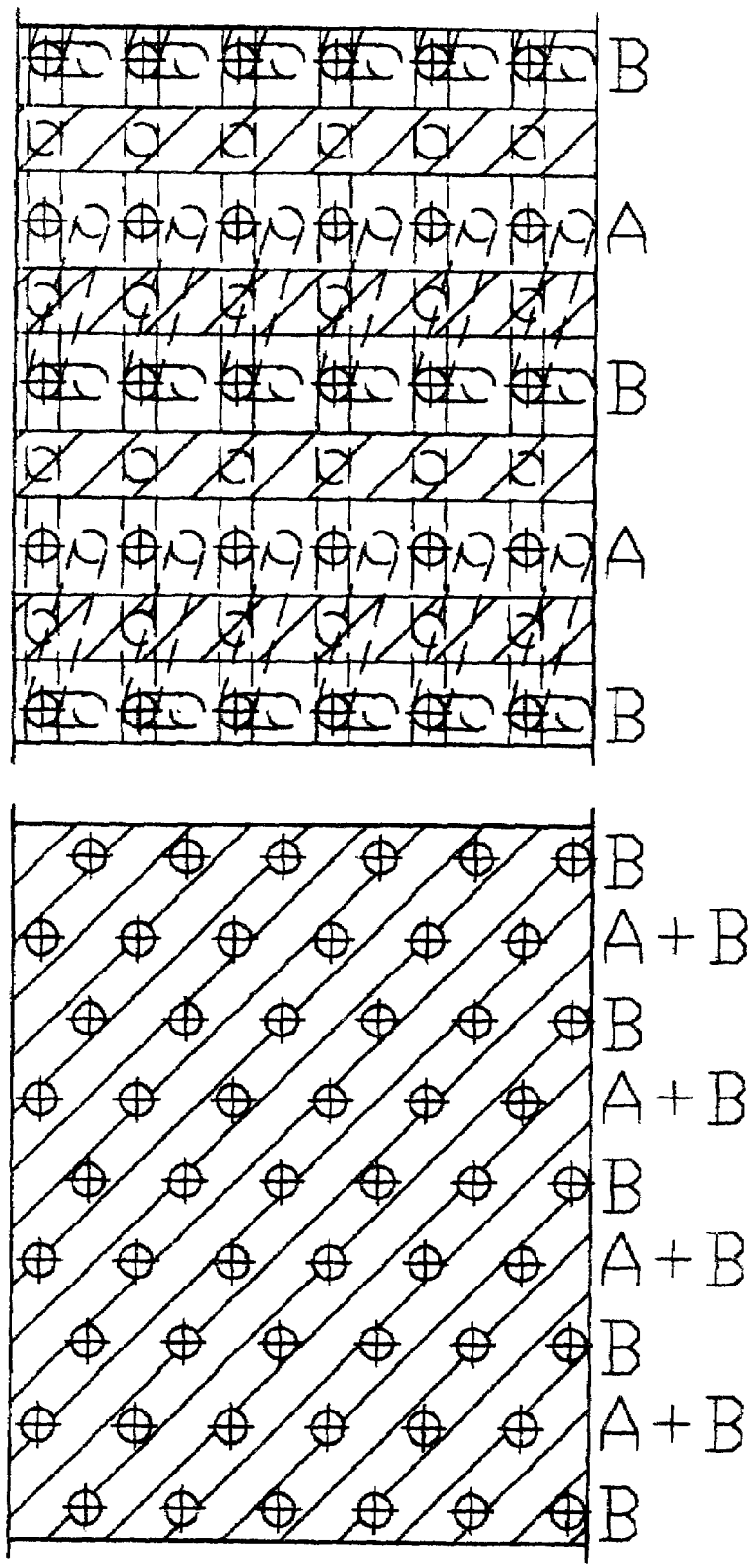

FIG. 18 shows a hole pattern for (A+B) fibre and B Fibre; i.e. (A+B):B=1:1 Ratio. There are two channels per glass A entry hole and four channels per glass B entry hole. Not all channels are the same diameter if (A+B):B mass ratio must be 1:1. There is horizontal layering of fibre types.

Figure 19:
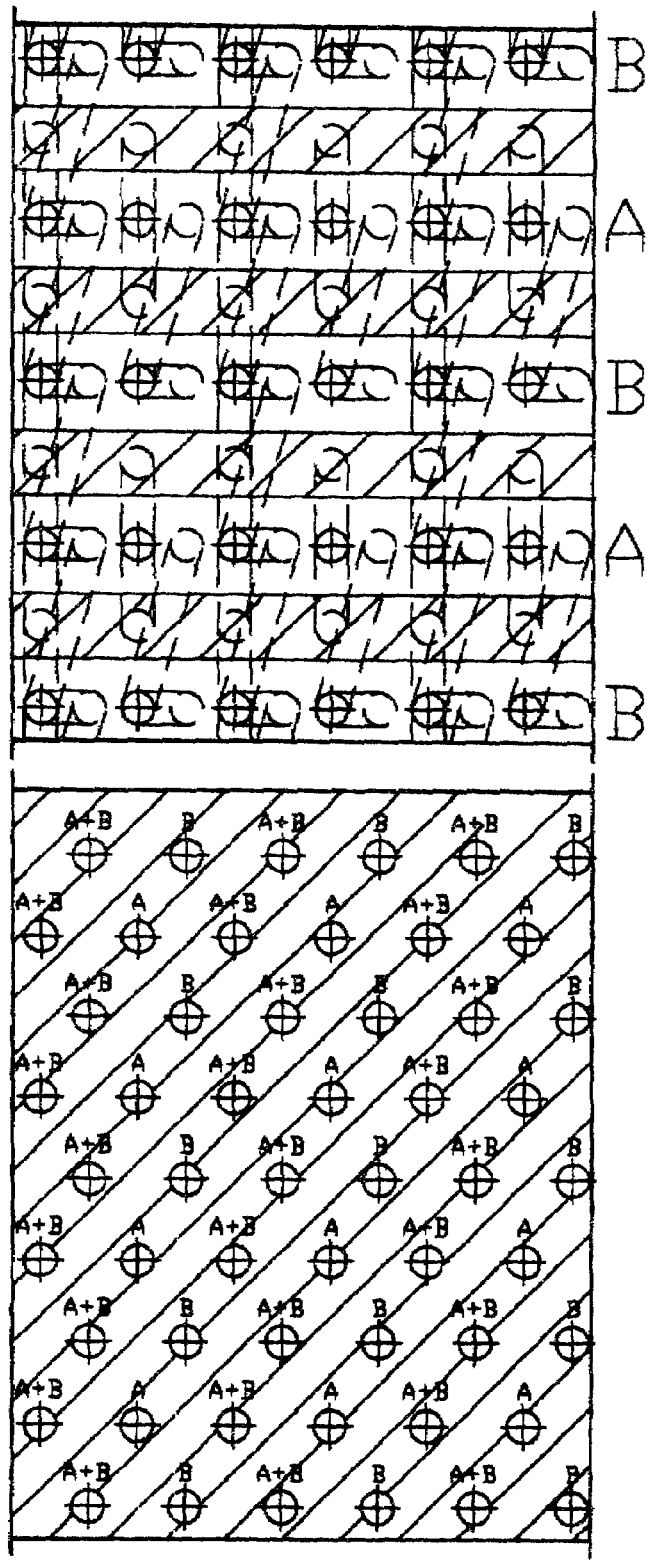

FIG. 19 shows a hole configuration for (A+B) fibre and A and B Fibre; i.e. (A+B):(A,B)=1:1. There is a 2-D Mixing Entry hole for glass A equipped alternately with two or four channels. Similarly, entry holes for glass B communicate alternately with two or four channels. In principle, channels are not of the same diameter. For a given row, neighbouring fibres are always of opposite types, i.e., dual-glass and single-glass fibres. There is a two-dimensional fibre mixing pattern; not only row to row (vertical) but also within a given row (horizontal). Neighbouring rows have single-glass fibres made from different glasses. Dual-glass fibre to the combined glass A and glass B single-glass fibre mass ratio in a fibre mix is basically 1:1, i.e., with the same pull rate per exit hole.

Figure 20:
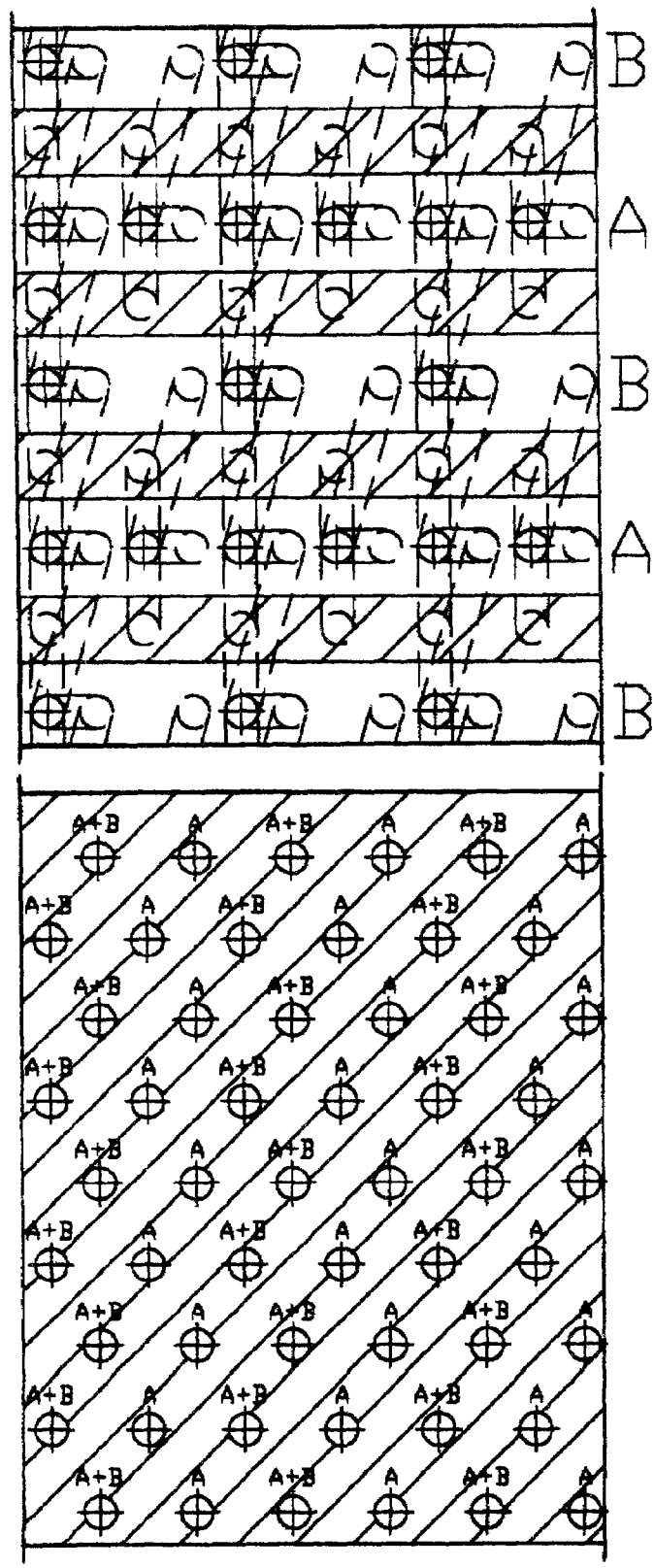

FIG. 20 shows a hole configuration for (A+B) fibre and A fibre; (A+B):A=1:1. That is a 2-D Mixing Entry hole for glass A is connected with four channels. An entry hole for glass B also has four channels. The number of glass B entry holes per row is half of that for glass A. If one is having the same mass flow rate per exit hole, the diameter of inclined channels starting at the entry point for glass A and reaching the zone internally prescribed for glass B, varies, depending whether this channel merges with the channel starting at glass B entry point or not. For the same mass flow rate per exit hole the mass ratio of dual-glass (A+B) fibre to single-glass, glass A only, fibre is 1:1. Fibres are well intermingled since the mixing process is 2-D (two-dimensional). In a given row, the neighbouring fibres are alternately of dual-glass and single-glass types (glass A).

What is claimed is:

1. An apparatus for making bi-component glass fibers including single straight glass fibers and dual glass component curly fibers, comprising:

a spinner having a bottom wall, a circumferential peripheral side wall, and an upper horizontally disposed top flange;

said apparatus including equipment for supplying first and second molten materials to a distributor spinner cup located within said spinner;

said spinner further comprising a plurality of vertically oriented flanges circumferentially placed about an inner surface of said spinner peripheral side wall;

said vertically oriented flanges extending radially inwards and terminating adjacent to an outer side of a vertically disposed peripheral wall of said distributor spinner cup, thereby providing a plurality of vertically oriented compartments;

said distributor spinner cup also including a bottom wall fixedly attached to said bottom wall of said spinner, and a horizontally disposed mid-flange extending inwardly from said vertically disposed peripheral wall;

said mid-flange including an upturned vertically disposed circumferential end flange, and said distributor cup having a horizontally disposed top flange extending radially inwardly from the top of said vertically disposed peripheral side wall;

said distributor spinner cup mid-flange being adapted to receive a second molten B glass stream and, in operation, through rotation, centrifugally move said glass B stream to an inner side of said peripheral wall of said cup, above said mid flange through a plurality of apertures openly connected to every second adjacent vertically oriented compartment;

said spinner distributor cup bottom wall being adapted to receive a first molten glass stream A and, in operation, through rotation, centrifugally move said first molten glass stream A to said inner side of said peripheral side wall of said distributor spinner cup below mid-flange, through a plurality of apertures openly connected to every first adjacent vertically oriented compartment;

said spinner peripheral side wall having an inner wall, an inner interior wall portion, an outer interior wall portion, located outwardly of said interior wall portion, and an outer wall;

portions of said inner wall and said inner interior wall of said spinner peripheral side wall having a plurality of first horizontal open slots, adapted to receive glass A from glass A vertical compartments, and vertically disposed upwards or downwards adjacently a plurality of second horizontal slots adapted to receive glass B from glass B vertical compartments; thus said horizontal slots being stacked upwardly and downwardly with adjacent molten glass streams of A and B glass;

each glass stream A exiting outwardly from said first horizontal slots to an annular, non-interrupted, horizontally-disposed cavity located circumferentially within said inner interior wall portion of the spinner peripheral side wall;

and each glass stream B exiting outwardly from said second horizontal slots to an annular, non-interrupted, horizontally-disposed cavity located circumferentially within said inner interior portion of the spinner peripheral side wall;

each of said cavities containing said A and b glasses, derived from said first and second horizontal slots, includes at least one exit orifice, each of which communicates with a plurality of passages extending outwardly within said outer interior wall of said spinner peripheral wall side wall; each of said passages joining together as combined A & B glass streams and exiting through common orifices in said outer wall of said spinner peripheral side wall to form in operation, dual-component helical, curly glass fibers of two glasses of differing coefficients of thermal expansion;

and said spinner peripheral side wall also comprising in at least one predetermined height portion a plurality of third adjacent vertically stacked horizontal open slots, all of which being adapted to accept only one of each of glass A or glass B;

each of said slots extending radially outwards throughout the said peripheral side wall to a single orifice in said outer wall, in operation, forming straight glass fibers;

wherein, in operation, said spinner creating a mixture of said dual-component helical curly glass fibers and said straight glass fibers to form a hybrid fiberglass insulation product.

2. An apparatus as claimed in claim 1 wherein said at least one predetermined height portion of said spinner peripheral side wall containing a plurality of third adjacent vertically stacked horizontal open slots, accepting glass A comprises substantially one-half of said spinner peripheral side wall, wherein, in operation said spinner produces an insulation product comprising a 1:1 mass ratio of straight glass fibers and dual-glass component curly fibers.

3. An apparatus as claimed in claim 1 wherein two predetermined height portions of said spinner peripheral side wall, containing a plurality of third adjacent vertically stacked horizontal open slots accepting glass A comprises substantially one-half of said spinner peripheral side wall, wherein, in operation said spinner produces an insulation product comprising a 1:1 mass ratio of straight glass fibers and dual-glass component curly fibers.

4. An apparatus as claimed in claim 1 wherein said at least one predetermined height portion of said spinner peripheral side wall containing a plurality of third adjacent vertically stacked horizontal open slots, accepting glass B comprises substantially one-half of said spinner peripheral side wall, wherein, in operation said spinner produces an insulation product comprising a 1:1 mass ratio of straight glass fibers and dual-glass component curly fibers.

5. An apparatus as claimed in claim 1 wherein two predetermined height portions of said spinner peripheral side wall, containing a plurality of third adjacent vertically stacked horizontal open slots accepting glass B comprises substantially one-half of said spinner peripheral side wall, wherein, in operation said spinner produces an insulation product comprising a 1:1 mass ratio of straight glass fibers and dual-glass component curly fibers.

6. An apparatus as claimed in claim 1 wherein one predetermined height portions of said spinner peripheral side wall, containing a plurality of third vertically stacked horizontal open slots accepting only glass A and one predetermined height portion of said side wall containing a plurality of third vertically stacked horizontal open slots accepting only glass B comprises substantially one-half of said peripheral wall, wherein, in operation said spinner produces an insulation product comprising a 1:1 mass ratio of A and B straight glass fibers and dual-glass A and B curly fibers.

7. An apparatus as claimed in claim 1 wherein said at least one predetermined height portion of said peripheral side wall containing a plurality of third adjacent vertically stacked horizontal open slots accepting one only of glass A or glass B, wherein in operation, said spinner produces an insulation product containing between 5% to 85% by product mass of dual glass curly fibers, and a remainder of straight fibers.

* * * * *